LE BARON M. JONES.
ROTARY MOLDING CUTTER.
APPLICATION FILED JUNE 13, 1908.
915,966.
Patented Mar. 23, 1909.
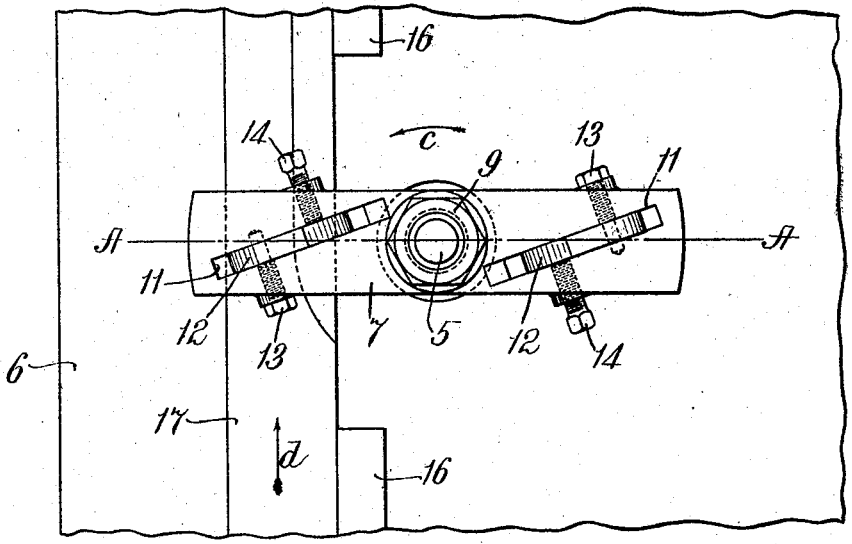
Fig. 1.
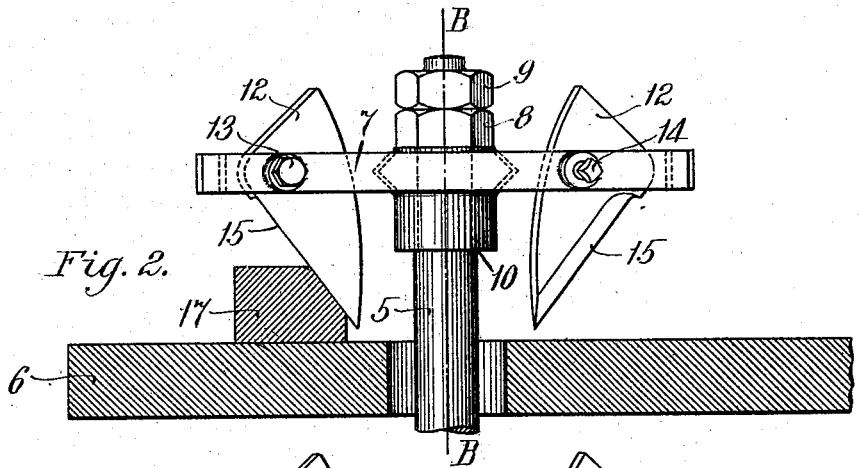
Fig. 2.
Fig. 3.
Witnesses.
Franklin E. Low.
Sydney E. Taft.
Inventor:
LeBaron M. Jones
by his attorney,
Charles J. Gooding.

UNITED STATES PATENT OFFICE.

LE BARON M. JONES, OF SOMERVILLE, MASSACHUSETTS, ASSIGNOR OF ONE-HALF TO HADLEY B. JONES, OF LYNN, MASSACHUSETTS.

ROTARY MOLDING-CUTTER.

No. 915,966.     Specification of Letters Patent.     Patented March 23, 1909.

Application filed June 13, 1908. Serial No. 438,259.

*To all whom it may concern:*

Be it known that I, LE BARON M. JONES, a subject of King Edward VII, residing at Somerville, in the county of Middlesex and State of Massachusetts, have invented new and useful Improvements in Rotary Molding-Cutters, of which the following is a specification.

This invention relates to an improved rotary molding cutter, and the objects are to provide a cutter in which the blades shall be capable of being adjusted to various angles so as to perform a variety of work; to provide a cutter which shall be low in cost as to the blades employed; to provide a cutter which shall have a shearing or sliding action on the work and to provide a cutter in which the blades are so mounted that centrifugal force will not throw said blades out of the holder.

The invention consists in the combination and arrangement of parts set forth in the following specification and particularly pointed out in the appended claims.

Referring to the drawings: Figure 1 is a plan of a molding cutter embodying my invention, said figure showing also the table and a piece supported thereon being operated upon by the cutter. Fig. 2 is an elevation of the cutter, the table and the piece being operated upon being shown in section. Fig. 3 is an elevation of the cutter provided with a modified form of blade.

Like numerals refer to like parts throughout the several views of the drawings.

In the drawing, 5 is a rotary shaft extending upwardly through a table 6; 7 is a holder constituting a part of the cutter, said holder being secured to the shaft 5 in any suitable or desired manner, as by means of a nut 8 and check-nut 9 which clamp said holder against a shoulder 10 formed on the shaft 5. The holder 7 is provided with two slots 11, 11 which are inclined to a plane A—A containing the axis B—B of the cutter. In the slots 11, 11, respectively, are located blades 12, 12 which are pivotally mounted on pivotal screws 13, 13, whereby said cutters may be adjusted to various angles, being secured in their adjusted positions by means of set screws 14, 14, respectively, which have screw-threaded engagement with the holder 7 and bear against said blades, respectively. The blades 12, 12 are provided, respectively, with cutting edges 15, 15, said cutting edges in the position shown being inclined to the axis B—B and being also inclined to the plane A—A which intersects said cutting edges. On the table 6 may be mounted the usual stops 16, 16 adapted to guide a piece of molding 17 which is being operated upon by the cutter.

The direction of rotation of the cutter is indicated by the arrow *c*, while the direction of movement of the stock being operated upon by the cutter is indicated by the arrow *d*.

It will be seen that the peculiar angle of inclination of the cutting edges 15, 15 to the plane A—A causes the cutter to have a shearing or sliding action on the work which tends to produce a clean smooth cut. It will also be understood that with this manner of mounting the blades, the same do not have to be very large and, therefore, there is a saving in cost in manufacture of the same. Furthermore, with the blades thus mounted there is no danger of their being thrown out by centrifugal force as in the case of the blades of ordinary cutters.

In Fig. 3, I have shown the cutter having the blades of substantially the same characteristics as the blades shown in Figs. 1 and 2, with the exception that the cutting edges are of irregular form so as to produce moldings of irregular cross section. These blades being also pivotally mounted on the holder, a great variety of forms can be produced.

The device of my invention is particularly adapted to produce raised panels and in doing work of this class the blades illustrated in Fig. 3 are adapted to produce a raised panel which is curved in cross section. Owing to the adjustable feature of the blades there is a great saving in cost over the ordinary rotary molding cutters in which there must necessarily be provided a very large number of different shapes to produce moldings and panels of different cross sections, and furthermore, such blades are often ground from time to time to produce slight variations in cross sectional contour, such grinding necessarily using up the blades rapidly.

In the use of the device of my invention, however, a great variety of work can be produced by simply changing the relation of the blades to the holder, as for example in the form illustrated in Figs. 1 and 2 the blades may be adjusted to a great variety of angles so as to change the angle of the bevel on the molding, thus these two blades will do the work of a large number of the ordinary blades and in addition much of the grinding of blades to change the shape thereof is obviated.

Having thus described my invention, what I claim and desire by Letters Patent to secure is:

1. The combination in a machine of the class described of a work-support, a shaft extending transversely of the face of said support, a holder fast to said shaft, a blade pivotally mounted on said holder at an acute angle to a plane containing the axis of said shaft and intersecting the cutting edge of said blade, said blade being adapted to be swung about its pivotal axis, whereby the angle of inclination of said cutting edge to the axis of said shaft may be varied, and means to secure said blade in fixed relation to said holder.

2. The combination in a machine of the class described of a work-support, a shaft extending transversely of the face of said support, a holder fast to said shaft, and a blade mounted on said holder, said blade having a cutting edge inclined to the axis of said shaft and also inclined to a plane containing said axis and intersecting said cutting edge, said blade being adjustably arranged on said holder, whereby the angle of inclination of said cutting edge to said axis may be varied.

3. The combination in a machine of the class described of a work-support, a shaft extending transversely of the face of said support, a holder fast to said shaft, a blade pivotally mounted on said holder and having a cutting edge inclined to the axis of said shaft and also inclined to a plane containing said axis and intersecting said cutting edge, and means to secure said blade in fixed relation to said holder.

4. The combination in a machine of the class described of a work-support, a shaft extending transversely of the face of said support, a holder fast to said shaft and provided with a slot, a blade located in said slot and pivotally connected to said holder, and means to secure said blade in fixed relation to said holder.

5. The combination in a machine of the class described of a work-support, a shaft extending transversely of the face of said support, a holder fast to said shaft and provided with a slot, a blade located in said slot and pivotally connected to said holder, and a set-screw having screw-threaded engagement with said holder and adapted to bear against said blade and hold the same in fixed relation to said holder.

6. The combination in a machine of the class described of a work-support, a shaft extending transversely of the face of said support, a holder fast to said shaft and provided with a slot inclined to a plane containing the axis of said shaft, a blade located in said slot and pivotally connected to said holder, and a set screw having screw-threaded engagement with said holder and adapted to clamp said blade in fixed relation to said holder.

In testimony whereof I have hereunto set my hand in presence of two subscribing witnesses.

LE BARON M. JONES.

Witnesses:
JOHN E. BOYDEN,
CORNELIUS R. BOWLLEY.